United States Patent
Kim et al.

(10) Patent No.: US 12,086,442 B2
(45) Date of Patent: Sep. 10, 2024

(54) STORAGE DEVICE AND OPERATING METHOD THEREOF

(71) Applicant: SK hynix Inc., Gyeonggi-do (KR)

(72) Inventors: Byung Jun Kim, Gyeonggi-do (KR); Taek Gyu Lee, Gyeonggi-do (KR); Kyoung Ku Cho, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 145 days.

(21) Appl. No.: 17/878,430

(22) Filed: Aug. 1, 2022

(65) Prior Publication Data

US 2023/0297261 A1 Sep. 21, 2023

(30) Foreign Application Priority Data

Mar. 18, 2022 (KR) ........................ 10-2022-0034336

(51) Int. Cl.
G06F 3/06 (2006.01)
G06F 12/02 (2006.01)

(52) U.S. Cl.
CPC ............ G06F 3/064 (2013.01); G06F 3/0607 (2013.01); G06F 3/0638 (2013.01); G06F 3/0658 (2013.01); G06F 3/0679 (2013.01)

(58) Field of Classification Search
CPC ...... G06F 3/064; G06F 3/0607; G06F 3/0658; G06F 3/0679; G06F 3/0638
USPC ......................................................... 711/154
See application file for complete search history.

(56) References Cited

U.S. PATENT DOCUMENTS

| 2018/0217951 | A1* | 8/2018 | Benisty | ............... | G06F 13/1642 |
| 2019/0236031 | A1* | 8/2019 | Kim | ........................ | G11C 16/22 |
| 2020/0356280 | A1* | 11/2020 | Sela | ....................... | G11C 11/409 |

FOREIGN PATENT DOCUMENTS

KR 10-2019-0092948 A 8/2019

OTHER PUBLICATIONS

NVM Express Base Specification, https://nvmexpress.org/wp-content/uploads/NVMe-NVM-Express-2.0a-2021.07.26-Ratified.pdf, Jul. 23, 2021 (Year: 2021).*
NVM Express NVM Command Set Specification, https://nvmexpress.org/wp-content/uploads/NVM-Express-NVM-Command-Set-Specification-1.0b-2021.12.18-Ratified.pdf, Jan. 6, 2022 (Year: 2022).*
NVM Expressed Explained, https://nvmexpress.org/wp-content/uploads/2013/04/NVM_whitepaper.pdf, (Year: 2013).*
NVM Express Base Specification, Revision 2.0a, Jul. 23, 2021, p. 2-442.

* cited by examiner

Primary Examiner — Arpan P. Savla
Assistant Examiner — Sidney Li
(74) Attorney, Agent, or Firm — IP & T GROUP LLP

(57) ABSTRACT

A storage device includes a nonvolatile memory device including a replay protected memory block; and a memory controller for, as a submission command requesting access to the replay protected memory block is received from an external host including a host memory having a plurality of Physical Region Pages (PRPs), acquiring a host replay protected memory block data frame stored in one of the plurality of PRPs included in the external host and accessing the replay protected memory block. The submission command may include information on a position at which the memory controller is to store a response to the submission command among the plurality of PRPs.

6 Claims, 18 Drawing Sheets

FIG. 5

| Dword | Byte 3 | | | | | | | | Byte 2 | | | | | | | | Byte 1 | | | | | | | | Byte 0 | | | | | | | |
|---|---|---|---|---|---|---|---|---|---|---|---|---|---|---|---|---|---|---|---|---|---|---|---|---|---|---|---|---|---|---|---|---|
| | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| 0 | | | | | Command Identifier | | | | | | | | | | | | PSDT | | | | | | FUSE | | | | | Opcode | | | | |
| 1 | Namespace Identifier | | | | | | | | | | | | | | | | | | | | | | | | | | | | | | | |
| 2 | | | | | | | | | | | | | | | | | | | | | | | | | | | | | | | | |
| 3 | | | | | | | | | | | | | | | | | | | | | | | | | | | | | | | | |
| 4 | Metadata Pointer | | | | | | | | | | | | | | | | | | | | | | | | | | | | | | | |
| 5 | | | | | | | | | | | | | | | | | | | | | | | | | | | | | | | | |
| 6 | PRP ENTRY 1 | | | | | | | | | | | | | | | | | | | | | | | | | | | | | | | |
| 7 | | | | | | | | | | | | | | | | | | | | | | | | | | | | | | | | |
| 8 | PRP ENTRY 2 | | | | | | | | | | | | | | | | | | | | | | | | | | | | | | | |
| 9 | | | | | | | | | | | | | | | | | | | | | | | | | | | | | | | | |
| 10 | | | | | | | | | | | | | | | | | | | | | | | | | | | | | | | | |
| 11 | | | | | | | | | | | | | | | | | | | | | | | | | | | | | | | | |
| 12 | | | | | | | | | | | | | | | | | | | | | | | | | | | | | | | | |
| 13 | | | | | | | | | | | | | | | | | | | | | | | | | | | | | | | | |
| 14 | | | | | | | | | | | | | | | | | | | | | | | | | | | | | | | | |
| 15 | | | | | | | | | | | | | | | | | | | | | | | | | | | | | | | | |

FIG. 6

RPMB Data Frame

| Stuff Bytes |
|---|
| Key / MAC |
| RPMB Target |
| Nonce |
| Write Counter |
| Address |
| Sector Count |
| Result |
| Request/Response Message |
| Data |

FIG. 8

RPMB Data Frame of Authentication Write (Send Submission)

| Field Name | Value |
|---|---|
| Stuff Bytes | 0...00h |
| Key / MAC | Mac generated by the host |
| RPMB Target | RPMB target to access |
| Nonce | 0...00h |
| Write Counter | Current Write Counter value |
| Address | Address in the RPMB |
| Sector Count | Number of 512B blocks |
| Result | 0000h |
| Request/Response Message | 0003h (Request) |
| Data | Data to be written |

FIG. 9

RPMB Data Frame of Authentication Write (Send Completion)

| Field Name | Value |
|---|---|
| Stuff Bytes | 0...00h |
| Key / MAC | Mac generated by the controller |
| RPMB Target | RPMB target response was sent from |
| Nonce | 0...00h |
| Write Counter | Incremented Write Counter value |
| Address | Address in the RPMB |
| Sector Count | 00000000h |
| Result | Result Code |
| Request/Response Message | 0300h (Response) |

FIG. 11

RPMB Data Frame of Authentication read (Receive Submission)

| Field Name | Value |
|---|---|
| Stuff Bytes | 0...00h |
| Key / MAC | 0..00h |
| RPMB Target | RPMB target to access |
| Nonce | Nonce generated by the host |
| Write Counter | 00000000h |
| Address | Address in the RPMB |
| Sector Count | Number of 512B blocks |
| Result | 0000h |
| Request/Response Message | 0004h (Request) |

FIG. 12

RPMB Data Frame of Authentication read (Receive Completion)

| Field Name | Value |
|---|---|
| Stuff Bytes | 0...00h |
| Key / MAC | MAC generated by the controller |
| RPMB Target | RPMB target response was sent from |
| Nonce | Copy of the Nonce generated by the host |
| Write Counter | 0000h |
| Address | Address in the RPMB |
| Sector Count | Number of 512B blocks |
| Result | Result Code |
| Request/Response Message | 0400h (Response) |
| Data | Data read from RPMB target |

STORAGE DEVICE AND OPERATING METHOD THEREOF

CROSS-REFERENCE TO RELATED APPLICATION

The present application claims priority under 35 U.S.C. § 119(a) to Korean patent application number 10-2022-0034336, filed on Mar. 18, 2022, the entire disclosure of which is incorporated herein by reference.

BACKGROUND

Field of Invention

The present disclosure generally relates to an electronic device, and more particularly, to a storage device and an operating method thereof.

Description of Related Art

A storage device is a device which stores data under the control of a host device such as a computer or a smart phone. The storage device may include a memory device for storing data and a memory controller for controlling the memory device. The memory device is classified into a volatile memory device and a nonvolatile memory device.

The volatile memory device is a memory device in which data is stored only when power is supplied, and stored data disappears when the supply of power is interrupted. The volatile memory device may include a Static Random Access Memory (SRAM), a Dynamic Random Access Memory (DRAM), and the like.

The nonvolatile memory device is a memory device in which data does not disappear even when the supply of power is interrupted. The nonvolatile memory device may include a Read Only Memory (ROM), a Programmable ROM (PROM), an Electrically Programmable ROM (EPROM), an Electrically Erasable ROM (EEROM), a flash memory, and the like.

SUMMARY

Embodiments of the present disclosure provide a storage device for providing an improved security function and an operating method of the storage device.

In accordance with an aspect of the present disclosure, there is provided a storage device including: a nonvolatile memory device including a replay protected memory block (RPMB); and a memory controller configured to acquire, in response to a submission command provided from an external host, a host RPMB data frame stored in one of a plurality of Physical Region Pages (PRPs) included in the external host, and access the RPMB, wherein the submission command includes information on a position within the plurality of PRPs at which the memory controller is to store a response to the submission command.

In accordance with another aspect of the present disclosure, there is provided a storage device including: a nonvolatile memory device including a replay protected memory block (RPMB); and a memory controller configured to acquire, in response to a submission command provided from an external host, a host RPMB data frame stored in one of a plurality of Physical Region Pages (PRPs) included in the external host, perform an authentication operation on the RPMB by using a host message authentication code included in the host RPMB data frame, and store write data in the RPMB according to a result of the authentication operation, wherein the submission command includes information on a position within the plurality of PRPs at which the memory controller is to store a response to the submission command.

In accordance with still another aspect of the present disclosure, there is provided a storage device including: a nonvolatile memory device including a replay protected memory block (RPMB); and a memory controller configured to acquire, in response to a submission command provided from an external host, a host RPMB data frame stored in one of a plurality of Physical Region Pages (PRPs) included in the external host, read data from the RPMB according to an address included in the host RPMB data frame, and provide the read data to the external host, wherein the submission command includes information on a position within the plurality of PRPs at which the memory controller is to store a response to the submission command.

In accordance with an aspect of the present disclosure, there is provided an operating method of a controller, the operating method comprising: acquiring, in response to a command provided together with first and second addresses from a host, access information from a first storage area within the host, the first storage area being indicated by the first address; controlling, based on the access information, a memory device to access a protected storage area therein; and issuing, into a second storage area within the host, a result of the access to the protected storage area as a response to the command, the second storage area being indicated by the second address.

In accordance with an aspect of the present disclosure, there is provided an operating method of a host, the operating method comprising: providing a memory system with a command together with first and second addresses respectively representing first and second storage areas therein; allowing the memory system to acquire, according to the first address, access information from the first storage area; and allowing the memory system to issue, according to the second address, a response to the command into the second storage area, wherein the access information enables the memory system to access a protected storage area therein to generate the response.

BRIEF DESCRIPTION OF THE DRAWINGS

Various embodiments of the present disclosure will now be described more fully hereinafter with reference to the accompanying drawings; however, the embodiments may be embodied in different forms and should not be construed as limited to the embodiments set forth herein. Rather, these embodiments are provided so that this disclosure will be thorough and complete, and will fully convey the scope of the embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

FIG. 5 is a diagram illustrating a format of a submission command in accordance with an embodiment of the present disclosure.

FIG. 6 is a diagram illustrating a structure of a RPMB data frame used when an operation on the RPMB is performed in accordance with an embodiment of the present disclosure.

FIGS. 8 and 9 are diagrams illustrating an embodiment of a RPMB data frame provided in the RPMB write operation in accordance with an embodiment of the present disclosure.

FIGS. 11 and 12 are diagrams illustrating an embodiment of a RPMB data frame provided in the RPMB read operation in accordance with an embodiment of the present disclosure.

DETAILED DESCRIPTION

The specific structural or functional description disclosed herein is merely illustrative for the purpose of describing embodiments according to the concept of the present disclosure. The embodiments according to the concept of the present disclosure can be implemented in various forms, and cannot be construed as limited to the embodiments set forth herein.

Figure 1:
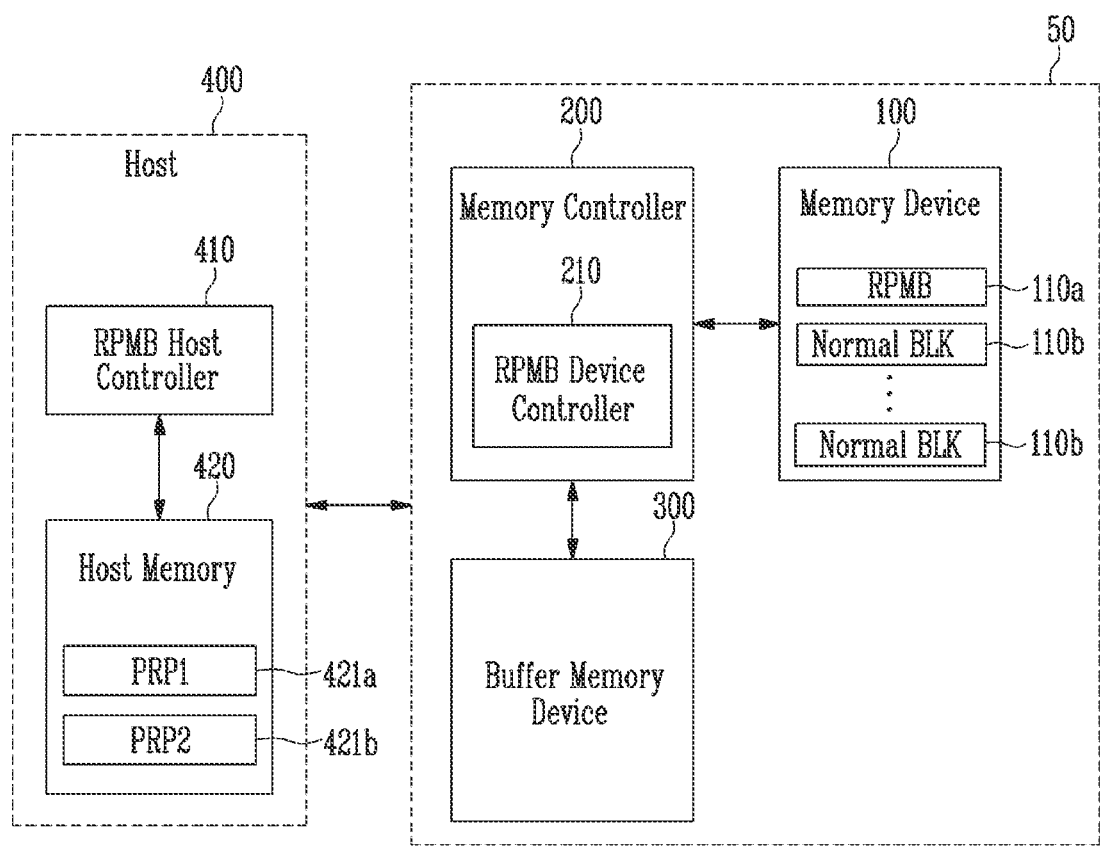
FIG. 1 is a diagram illustrating a storage device in accordance with an embodiment of the present disclosure.

FIG. 1 is a diagram illustrating a storage device in accordance with an embodiment of the present disclosure.

Referring to FIG. 1, the storage device 50 may include a memory device 100, a memory controller 200, and a buffer memory device 300. The storage device 50 may be a device for storing data under the control of a host 400, such as a mobile phone, a smart phone, an MP3 player, a laptop computer, a desktop computer, a game console, a TV, a tablet PC or an in-vehicle infotainment system. Alternatively, the storage device 50 may be a device for storing data under the control of the host 400 for storing high-capacity data in one place, such as a server or a data center.

The storage device 50 may be manufactured as one of various types of storage devices according to a host interface that is a communication scheme with the host 400. For example, the storage device 50 may be configured as one of various types of storage devices which include a Solid State Drive (SSD), a Multi-Media Card (MMC) such as an eMMC, RS-MMC or micro-MMC, an SD (Secure Digital) card such as an SD, a mini-SD or a micro-SD, a Universal Serial Bus (USB) storage device, a Universal Flash Storage (UFS) device, a Non-Volatile Memory express (NVMe) storage device, a Personal Computer Memory Card International Association (PCMCIA) card-type storage device, a Peripheral Component Interconnection (PCI) card-type storage device, a PCI-express (PCI-e) card-type storage device, a Compact Flash (CF) card, a smart media card, and a memory stick.

The storage device 50 may be manufactured as one of various package types. For example, the storage device 50 may be manufactured as one of various package types such as a Package-On-Package (POP), a System-In-Package (SIP), a System-On-Chip (SOC), a Multi-Chip Package (MCP), a Chip-On-Board (COB), a Wafer-level Fabricated Package (WFP), and a Wafer-level Stack Package (WSP).

The memory device 100 may store data. The memory device 100 may operate under the control of the memory controller 200. The memory device 100 may include a memory cell array (not shown) including a plurality of memory cells for storing data.

Each of the memory cells may be configured as one of a Single Level Cell (SLC) storing one data bit, a Multi-Level Cell (MLC) storing two data bits, a Triple Level Cell (TLC) storing three data bits, and a Quadruple Level Cell (QLC) storing four data bits.

The memory cell array (not shown) may include a plurality of memory blocks. Each memory block may include a plurality of memory cells. Each memory block may include a plurality of pages. In an embodiment, the page may be a unit for storing data in the memory device 100 or reading data stored in the memory device 100. The memory block may be a unit for erasing data.

The memory blocks included in the memory device 100 may include a replay protected memory block (RPMB) 110a and a normal block (BLK) 110b.

The RPMB 110a may be accessed through only a predetermined specific command or authentication. A write count of the RPMB 110a may be limited to a certain number of times by the host 400. When a write operation corresponding to a maximum write counter value of the RPMB 110a is performed, only a read operation on the RPMB 110a may be allowed.

Access to the RPMB 110a may be allowed only when authentication is passed. Authentication of the RPMB 110a may be an operation of, when the host 400 and the storage device 50 store the same authentication key (Key) only once, determining whether message authentication codes (MACs) which the host 400 and the storage device 50 respectively generate by using data to be stored and the authentication key (Key) accord with each other. The host 400 and the storage device 50 may respectively generate the message authentication codes (MACs) by using a hash-based message authentication code (HMAC SHA-256). However, in the present disclosure, the method of generating the message authentication codes (MAC) is not limited thereto. Data stored in the RPMB 110a may be maintained while the authentication key (Key) and a value of a write counter are maintained.

In FIG. 1, it is illustrated that the memory device 100 includes one RPMB 110a. However, the memory device 100 may include two or more RPMBs 110a. Each RPMB 110a may include a unique authentication key and a unique write count value.

The normal block 110b may be a memory block which can be accessed without separate authentication. The normal block 110b may be a memory block storing data except the data stored in the RPMB 110a.

In an embodiment, the memory device 100 may be a Double Data Rate Synchronous Dynamic Random Access Memory (DDR SDRAM), a Low Power Double Data Rate 4 (LPDDR4) SDRAM, a Graphics Double Data Rate (GDDR) SRAM, a Low Power DDR (LPDDR), a Rambus Dynamic Random Access Memory (RDRAM), a NAND flash memory, a vertical NAND flash memory, a NOR flash memory, a Resistive Random Access Memory (RRAM), a Phase-Change Random Access Memory (PRAM), a Magnetoresistive Random Access Memory (MRAM), a Ferroelectric Random Access Memory (FRAM), a Spin Transfer Torque Random Access Memory (STT-RAM), or the like. In this specification, for convenience of description, a case where the memory device 100 is a NAND flash memory is described.

The memory device 100 may receive a command and an address from the memory controller 200, and access an area selected by the address in the memory cell array. The memory device 100 may perform an operation indicated by the command on the area selected by the address. For example, the memory device 100 may perform a write operation (program operation), a read operation, and an erase operation. In the program operation, the memory device 100 may program data in the area selected by the address. In the read operation, the memory device 100 may read data from the area selected by the address. In the erase operation, the memory device 100 may erase data stored in the area selected by the address.

The memory controller 200 may control overall operations of the storage device 50.

When power is applied to the storage device 50, the memory controller 200 may execute firmware (FW). When the memory device 100 is a flash memory device, the memory controller 200 may execute FW such as a flash translation layer (FTL) for controlling communication between the host 400 and the memory device 100.

In an embodiment, the memory controller 200 may receive data and a Logical Block Address (LBA) from the host 400, and translate the LBA into a Physical Block Address (PBA) representing addresses of memory cells included in the memory device 100, in which data is to be stored.

The memory controller 200 may control the memory device 100 to perform a program operation, a read operation, an erase operation, or the like in response to a request from the host 400. In the program operation, the memory controller 200 may provide a program command, a PBA, and data to the memory device 100. In the read operation, the memory controller 200 may provide a read command and a PBA to the memory device 100. In the erase operation, the memory controller 200 may provide an erase command and a PBA to the memory device 100.

In an embodiment, the memory controller 200 may autonomously generate a command, an address, and data regardless of any request from the host 400, and transmit the command, the address, and the data to the memory device 100. For example, the memory controller 200 may provide the memory device 100 with a command, an address, and data, which are used to perform read and program operations accompanied in performing wear leveling, read reclaim, garbage collection, or the like.

In an embodiment, the memory controller 200 may control at least two memory devices 100. The memory controller 200 may control the memory devices according to an interleaving scheme to improve operational performance. The interleaving scheme may be a scheme for controlling operations on at least two memory devices 100 to overlap with each other.

The memory controller 200 may include a RPMB device controller 210.

The RPMB device controller 210 may process an access request for the RPMB 110a.

The RPMB device controller 210 may process a RPMB write operation of storing data in the RPMB 110a and a RPMB read operation of reading data stored in the RPMB 110a.

More specifically, the RPMB device controller 210 may process an authentication key programming operation of storing an authentication key in the RPMB 110a, a write counter value read operation of reading a write counter value of the RPMB 110a, an authentication data write operation of writing authenticated data in the RPMB 110a, an authentication data read operation of reading data stored in the RPMB 110 after the data is authenticated, an authentication device configuration block write operation of writing device configuration block data, and an authentication device configuration block read operation of reading device configuration block data.

A detailed method in which the RPMB device controller 210 processes the RPMB write operation and the RPMB read operation will be described in more detail with reference to FIGS. 4 to 16 which will be described later.

Data exchanged between the host 400 and the memory controller 200 may be transmitted through the buffer memory device 300.

The host 400 may communicate with the storage device 50, using at least one of various communication standards or interfaces, such as a Universal Serial bus (USB), a Serial AT Attachment (SATA), a High Speed InterChip (HSIC), a Small Computer System Interface (SCSI), Firewire, a Peripheral Component Interconnection (PCI), a PCI express (PCIe), a Non-Volatile Memory express (NVMe), a universal flash storage (UFS), a Secure Digital (SD), a Multi-Media Card (MMC), an embedded MMC (eMMC), a Dual In-line Memory Module (DIMM), a Registered DIMM (RDIMM), and a Load Reduced DIMM (LRDIMM).

The host 400 may further include a RPMB host controller 410.

The RPMB host controller 410 may generate data frames in response to several requests or commands for controlling the RPMB 110a, and provide the data frames to the RPMB device controller 210. The RPMB host controller 410 may receive a response or a processing result from the RPMB device controller 210.

The host 400 may further include a host memory 420. The host memory 420 may be an area which the storage device 50 can directly access.

The host memory 420 may include a plurality of Physical Region Pages (PRPs). More specifically, a Host Memory Buffer (HMB) (not shown) in the host memory 420 may include a plurality of PRPs. The HMB is a portion of the host memory 420, and may be an area which the storage device 50 can independently use. Accordingly, the HMB can be used as a data buffer between the host 400 and the storage device 50.

Although a case where the host memory 420 includes a first PRP PRP1 421*a* and a second PRP PRP2 421*b* is illustrated in FIG. 1, the number of PRPs included in the host memory 420 is not limited thereto.

Although a case where the host memory 420 is a memory device included in the host 400 is illustrated in FIG. 1, the present disclosure is not limited thereto, and the host memory 420 may be a separate memory device capable of performing a role of the buffer memory device or a memory device included in the storage device 50.

The PRP may be a region logically sorted in the host memory 420. When communication is performed by using a Non-Volatile Memory express (NVMe) interface between the storage device 50 and the host 400, the PRP may be a unit for sorting a logical region in which data is to be stored. For example, the PRP1 may be used to temporarily store data provided to the memory controller 200 from an external host, and the PRP2 may be used to temporarily store data provided to the external host from the memory controller 200. Alternatively, the PRP1 may be used to temporarily store data provided to the external host from the memory controller 200, and the PRP2 may be used to temporarily store data provided to the memory controller 200 from the external host. The PRP1 and the PRP2 may be regions specified by PRP entry 1 and PRP entry 2, which are included in a command which the host 400 provides to the memory controller 200.

Figure 2:
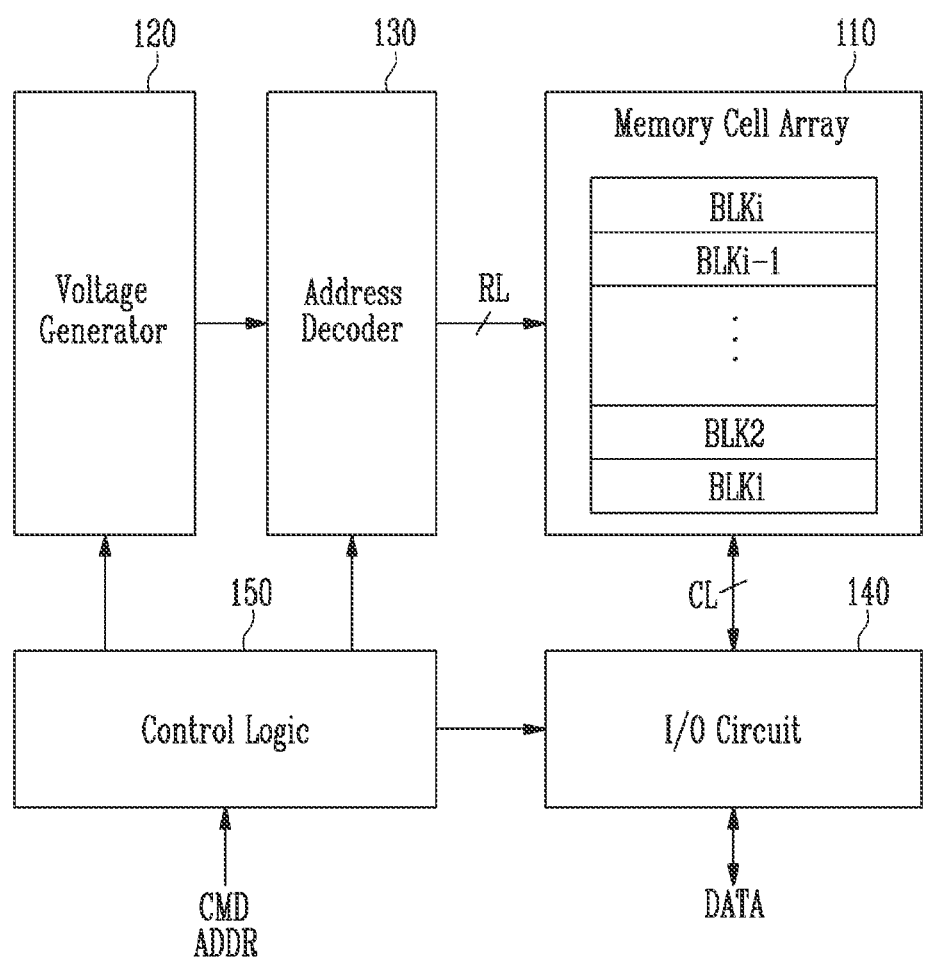
FIG. 2 is a diagram illustrating a memory device shown in FIG. 1 in accordance with an embodiment of the present disclosure.

FIG. 2 is a diagram illustrating the memory device shown in FIG. 1 in accordance with an embodiment of the present disclosure.

Referring to FIG. 2, the memory device 100 may include a memory cell array 110, a voltage generator 120, an address decoder 130, an input/output (I/O) circuit 140, and a control logic 150.

The memory cell array 110 may include a plurality of memory blocks BLK1 to BLKi. The plurality of memory blocks BLK1 to BLKi may be connected to the address decoder 130 through row lines RL. The plurality of memory blocks BLK1 to BLKi may be connected to the input/output circuit 140 through column lines CL. In an embodiment, the row lines RL may include word lines, source select lines, and drain select lines. In an embodiment, the column lines CL may include bit lines.

Each of the plurality of memory blocks BLK1 to BLKi includes a plurality of memory cells. In an embodiment, the plurality of memory cells may be nonvolatile memory cells. Memory cells connected to the same word line among the plurality of memory cells may be defined as one physical page. That is, the memory cell array 110 may include a plurality of physical pages. Each of the memory cells of the memory device 100 may be configured as a Single Level Cell (SLC) storing one data bit, a Multi-Level Cell (MLC) storing two data bits, a Triple Level Cell (TLC) storing three data bits, or a Quad Level Cell (QLC) storing four data bits.

Some of the plurality of memory blocks BLK1 to BLKi may be RPMBs 110*a* described with reference to FIG. 1. The others of the plurality of memory blocks BLK1 to BLKi may be normal blocks 110*b* described with reference to FIG. 1.

In an embodiment, the voltage generator 120, the address decoder 130, and the input/output circuit 140 may be commonly designated as a peripheral circuit. The peripheral circuit may drive the memory cell array 110 under the control of the control logic 150. The peripheral circuit may drive the memory cell array 110 to perform a program operation, a read operation, and an erase operation.

The voltage generator 120 may generate a plurality of operating voltages by using an external power voltage supplied to the memory device 100. The voltage generator 120 may operate under the control of the control logic 150.

In an embodiment, the voltage generator 120 may generate an internal power voltage by regulating the external power voltage. The internal power voltage generated by the voltage generator 120 may be used as an operating voltage of the memory device 100.

In an embodiment, the voltage generator 120 may generate a plurality of operating voltages by using the external power voltage or the internal power voltage. The voltage generator 120 may generate various voltages required in the memory device 100. For example, the voltage generator 120 may generate a plurality of erase voltages, a plurality of program voltages, a plurality of pass voltages, a plurality of select read voltages, and a plurality of unselect read voltages.

In order to generate a plurality of operating voltages having various voltage levels, the voltage generator 120 may include a plurality of pumping capacitors which receive the internal power voltage. The voltage generator 120 may generate the plurality of operating voltages by selectively activating the plurality of pumping capacitors under the control of the control logic 150.

The plurality of operating voltages generated by the voltage generator 120 may be supplied to the memory cell array 110 by the address decoder 130.

The address decoder 130 may be connected to the memory cell array 110 through the row lines RL. The address decoder 130 may operate under the control of the control logic 150. The address decoder 130 may receive an address ADDR from the control logic 150. The address decoder 130 may decode a block address in the received address ADDR. The address decoder 130 may select at least one memory block among the memory blocks BLK1 to BLKi according to the decoded block address. The address decoder 130 may decode a row address in the received address ADDR. The address decoder 130 may select at least one word line among word lines of the selected memory block according to the decoded row address. In an embodiment, the address decoder 130 may decode a column address in the received address ADDR. The address decoder 130 may connect the input/output circuit 140 and the memory cell array 110 to each other according to the decoded column address.

The address decoder 130 may include components such as a row decoder, a column decoder, and an address buffer.

The input/output circuit 140 may include a plurality of page buffers. The plurality of page buffers may be connected to the memory cell array 110 through the bit lines. In a program operation, data may be stored in selected memory cells according to data stored in the plurality of page buffers.

In a read operation, the data stored in the selected memory cells may be sensed through the bit lines, and the sensed data may be stored in the page buffers.

The control logic 150 may control the address decoder 130, the voltage generator 120, and the input/output circuit 140. The control logic 150 may operate in response to a command CMD transferred from an external device. The control logic 150 may control the peripheral circuit by generating control signals in response to the command CMD and the address ADDR.

Figure 3:
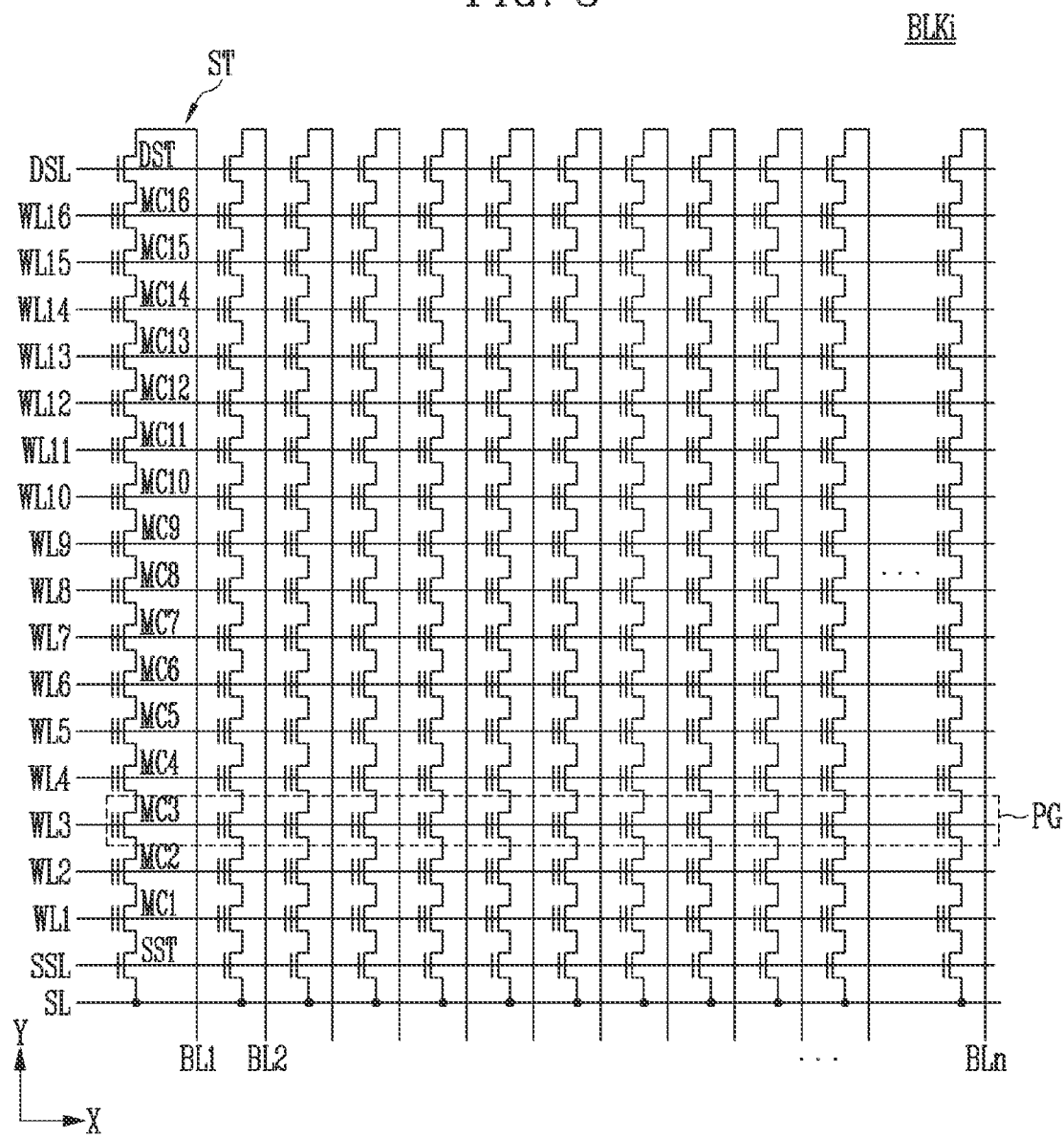
FIG. 3 is a diagram illustrating a structure of a memory block among memory blocks shown in FIG. 2 in accordance with an embodiment of the present disclosure.

FIG. 3 is a diagram illustrating a structure of a memory block among the memory blocks shown in FIG. 2 in accordance with an embodiment of the present disclosure.

A memory block BLKi represents a memory block BLKi among the memory blocks BLK1 to BLKi shown in FIG. 2.

Referring to FIG. 3, in the memory block BLKi, a plurality of word lines arranged in parallel to each other may be connected between a first select line and a second select line. The first select line may be a source select line SSL, and the second select line may be a drain select line DSL. More specifically, the memory block BLKi may include a plurality of strings ST connected between bit lines BL1 to BLm and a source line SL. The bit lines BL1 to BLm may be respectively connected to the strings ST, and the source line SL may be commonly connected to the strings ST. The strings ST may be configured identically to one another, and therefore, a string ST connected to a first bit line BL1 will be described in detail as an example.

The string ST may include a source select transistor SST, a plurality of memory cells MC1 to MC16, and a drain select transistor DST, which are connected in series to each other between the source line SL and the first bit line BL1. At least one drain select transistor DST may be included in one string ST, and a number of source select transistors which is greater than that of the source select transistor SST shown in the drawing and a number of memory cells which is greater than that of the memory cells MC1 to MC16 shown in the drawing may be included in the one string ST.

A source of the source select transistor SST may be connected to the source line SL, and a drain of the drain select transistor DST may be connected to the first bit line BL1. The memory cells MC1 to MC16 may be connected in series between the source select transistor SST and the drain select transistor DST. Gates of source select transistors SST included in different strings ST may be connected to the source select line SSL, and gates of drain select transistors DST included in different strings ST may be connected to the drain select line DSL. Gates of the memory cells MC1 to MC16 may be connected to a plurality of word lines WL1 to WL16. A group of memory cells connected to the same word line among memory cells included in different strings ST may be referred to as a physical page PG. Therefore, physical pages PG corresponding to the number of the word lines WL1 to WL16 may be included in the memory block BLKi.

One memory cell may store one-bit data. The one memory cell is generally referred to as a single level cell (SLC). One physical page PG may store one logical page (LPG) data. One LPG data may include data bits corresponding to the number of cells included in the one physical page PG.

One memory cell may store two or more-bit data. One physical page PG may store two or more LPG data.

Figure 4:
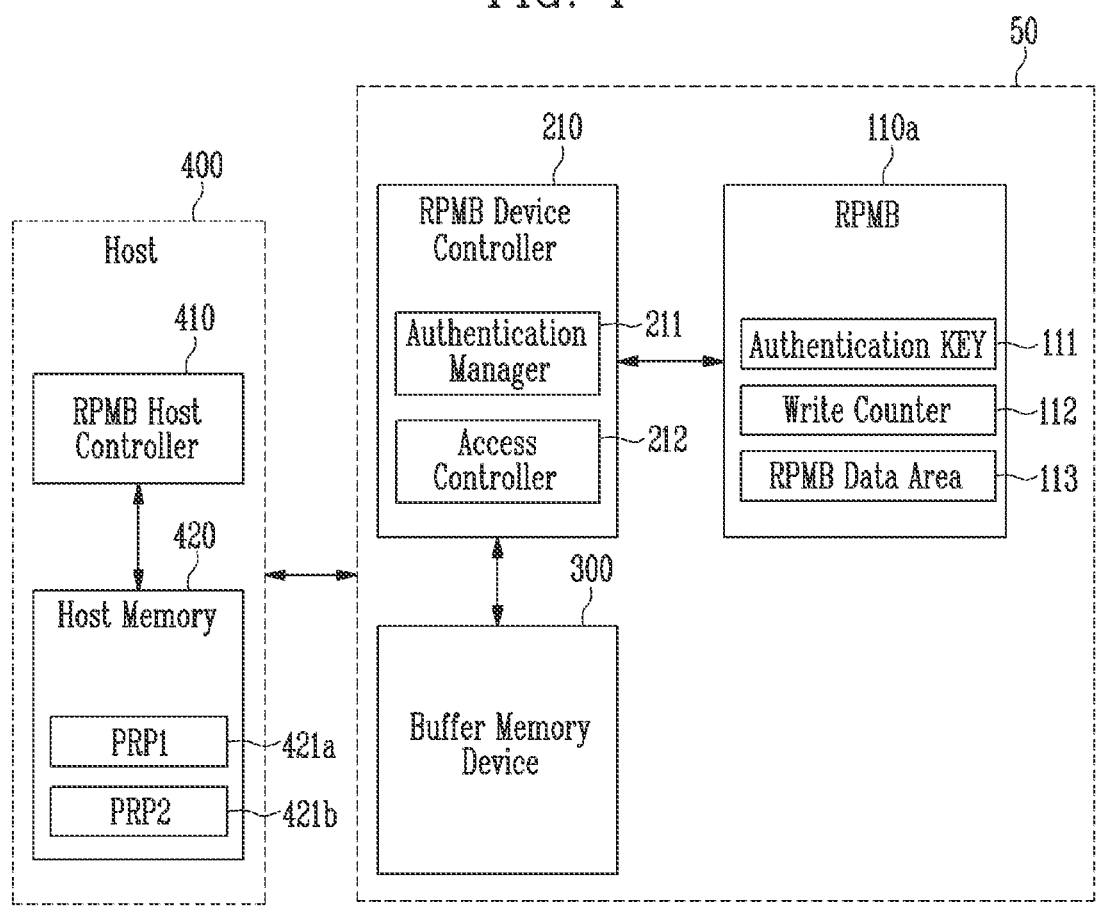
FIG. 4 is a diagram illustrating an access operation on a RPMB in accordance with an embodiment of the present disclosure.

FIG. 4 is a diagram illustrating an access operation on a RPMB in accordance with an embodiment of the present disclosure.

Referring to FIG. 4, the storage device 50 may include a RPMB 110a and a RPMB device controller 210 for controlling the RPMB 110a. The RPMB 110a may be one block among the memory blocks included in the memory device 100 described with reference to FIG. 1, and the RPMB device controller 210 may be included in the memory controller 200.

The RPMB 110a may include an authentication key storage in which an authentication key 111 is stored, a write counter 112, and a RPMB data area 113.

The authentication key 111 is stored only once, cannot be read, and can be accessed only when a Message Authentication Code (MAC) for only authentication is calculated. In an embodiment, the authentication key 111 may have a size of 32 bytes.

The write counter 112 may count a number of times a RPMB write operation is successfully performed. The write counter 112 may store a write count value corresponding to 4 bytes. A value of the write counter 112 may be "00000000h." The write count value of the write counter 112 may not be reset or decreased. The value of the write counter 112 may no longer increase after the value of the write counter 112 reaches "FFFFFFFFh." Therefore, when the value of the write counter 112 reaches a maximum value, any data may be no longer stored in the RPMB 110a, and the RPMB 110a may operate as only a readable block.

In an embodiment, the authentication key 111 and the write counter 112 may be independently included in each RPMB 110a, and have a unique value.

The RPMB data area may be an area in which data is stored only when authentication is passed.

When the RPMB write operation is performed, the RPMB host controller 410 may provide a host RPMB data frame to the RPMB device controller 210 according to a predetermined format. The host RPMB data frame provided from the RPMB host controller 410 may be stored in a region selected from the PRP1 421a and the PRP2 421b in the host memory 420 and then provided to the RPMB device controller 210. Transmission of the host RPMB data frame from the RPMB host controller 410 to the RPMB device controller 210 may be performed in response to a submission command which the memory controller 200 receives from the host 400. The submission command may include information on an address in the plurality of PRPs in which the host RPMB data frame is stored.

The host RPMB data frame provided from the RPMB host controller 410 may include information representing that the host RPMB data frame is a data frame for requesting writing on the RPMB. Also, the host RPMB data frame may include write data to be stored in the RPMB. The host RPMB data frame provided from the RPMB host controller 410 may include information required to perform an authentication operation on the RPMB. For example, the host RPMB data frame may include authentication data and metadata. The authentication data may include the MAC generated by the RPMB host controller 410. The metadata may be the other data except the authentication data.

The RPMB device controller 210 may further include an authentication manager 211 and an access controller 212.

The authentication manager 211 may perform an authentication operation by using the authentication data and the metadata, which are included in the host RPMB data frame and authentication key 111 stored in the RPMB 110a. The authentication manager 211 may provide the access controller 212 with a result of the authentication operation. The access controller 212 may store data in the RPMB 110a or prohibit any data to be stored in the RPMB 110a according to the result of the authentication operation.

When the authentication operation is passed, the access controller 212 may control the RPMB 110a to store write data to be stored in the RPMB 110a in the RPMB data area 113. The access controller 212 may increase the value of the write counter 112.

When the authentication operation fails, the access controller 112 may not store the write data requested to be stored in the RPMB 110a in the RPMB data area 113. The access controller 212 may maintain the value of the write counter 112.

When the RPMB write operation is completed, the RPMB device controller 210 may provide a device RPMB data frame to the RPMB host controller 410. The device RPMB data frame may include information representing that the device RPMB data frame is a response to the submission command.

The device RPMB data frame provided from the RPMB device controller 210 may be stored in a region selected from the PRP1 and the PRP2 in the host memory 420 and then provided to the RPMB host controller 410. Transmission of the device RPMB data frame from the RPMB device controller 210 to the RPMB host controller 410 may be a response to a submission command which the host 400 receives from the memory controller 200. The submission command may include information on an address in the plurality of PRP in which the host RPMB data frame is to be stored. Among the plurality of PRPs, a position at which the host RPMB data frame is stored and a position at which the device RPMB data frame is stored may be different from each other. Information on a position at which the host RPMB data frame is stored in the plurality of PRPs may be included in one of the PRP entry 1 and the PRP entry 2 in the submission command, and information on a position at which the device RPMB data frame is stored in the plurality of PRPs may be included in the other of the PRP entry 1 and the PRP entry 2 in the submission command.

After the device RPMB data frame is stored at the address in the plurality of PRPs, the memory controller 200 may provide a completion command to the host 400. The completion command may be a command notifying the host 400 that an operation according to the submission command has been completed.

When a RPMB read operation is performed, the RPMB host controller 410 may provide a host RPMB data frame to the RPMB device controller 210 according to a predetermined format. The host RPMB data frame provided from the RPMB host controller 410 may be stored in a region selected from the PRP1 and the PRP2 in the host memory 420 and then provided to the RPMB device controller 210. Transmission of the host RPMB data frame from the RPMB host controller 410 to the RPMB device controller 210 may be performed as the memory controller 200 receives a submission command from the host 400. The submission command may include information on an address in the plurality of PRPs in which the host RPMB data frame is stored.

The host RPMB data frame provided from the RPMB host controller 410 may include information representing that the host RPMB data frame is a data frame for requesting reading on the RPMB. Also, the host RPMB data frame may include metadata.

The access controller 212 may read data stored in the RPMB according to an address included in the host RPMB data frame, and generate a device RPMB data frame to be provided to the RPMB host controller 410. The access controller 212 may acquire a portion (e.g., nonce) of the metadata included in the host RPMB data frame received from the RPMB host controller 410, and generate metadata including the portion of the metadata included in the host RPMB data frame received from the RPMB host controller 410 and a result of the RPMB read operation. The access controller 212 may generate an authentication data by using the generated metadata and the authentication key 111 stored in the RPMB 110*a*. The authentication data may include an MAC used for an authentication operation which the RPMB host controller 410 subsequently performs to access read data.

The access controller 212 may generate a device RPMB data frame including the generated metadata, the generated authentication data, and the read data, and provide the device RPMB data frame to the RPMB host controller 410.

The device RPMB data frame may be stored in a region selected from the PRP1 and the PRP2 in the host memory 420 and then provided to the RPMB host controller 410. Transmission of the device RPMB data frame from the RPMB device controller 210 to the RPMB host controller 410 may be a response to a submission command which the memory controller 200 receives from the host 400. The submission command may include information on an address in the plurality of PRPs in which the device RPMB data frame is to be stored. Among the plurality of PRPs, a position at which the host RPMB data frame is stored and a position at which the device RPMB data frame is stored may be different from each other. Information on a position at which the host RPMB data frame is stored in the plurality of PRPs may be included in one of the PRP entry 1 and the PRP entry 2, and information on a position at which the device RPMB data frame is stored in the plurality of PRPs may be included in the other of the PRP entry 1 and the PRP entry 2.

After the device RPMB data frame is stored at an address in the plurality of PRPs, the memory controller 200 may provide a completion command to the host 400. The completion command may be a command notifying the host 400 that an operation according to the submission command has been completed.

The RPMB host controller 410 may receive the device RPMB data frame, calculate an MAC by using the metadata included in the device RPMB data frame and the authentication key stored in the RPMB host controller 410, and successfully receive data when the calculated MAC accords with the MAC included in the device RPMB data frame.

The data exchanged between the RPMB host controller 410 and the RPMB device controller 210 may be transmitted through the host memory 420. The host memory 420 may include a plurality of PRPs. More specifically, a host memory buffer (HMB) (not shown) in the host memory 420 may include a plurality of PRPs. The HMB is a portion of the host memory 420, and may be an area which the storage device 50 can independently use. Accordingly, the HMB can be used as a data buffer between the host 400 and the storage device 50.

Although a case where the host memory 420 includes the first PRP PRP1 and the second PRP PRP2 is illustrated in FIG. 4, the number of PRPs included in the host memory 420 is not limited thereto. Also, although a case where the host memory 420 is a memory device included in the host 400 is illustrated in FIG. 4, the present disclosure is not limited thereto, and the host memory 420 may be a separate memory device capable of performing a role of the buffer memory device or a memory device included in the storage device 50.

The PRP may be a region logically sorted in the host memory 420. When communication is performed by using a Non-Volatile Memory express (NVMe) interface between the storage device 50 and the host 400, the PRP may be a unit for sorting a logical region in which data is to be stored. For example, the PRP1 may be used to temporarily store data provided to the memory controller 200 from an external host, and the PRP2 may be used to temporarily store data provided to the external host from the memory controller 200. Alternatively, the PRP1 may be used to temporarily store data provided to the external host from the memory controller 200, and the PRP2 may be used to temporarily store data provided to the memory controller 200 from the external host. The PRP1 and the PRP2 may be regions specified by PRP entry 1 and PRP entry 2, which are included in a command which the host 400 provides to the memory controller 200.

FIG. 5 is a diagram illustrating a submission command generated by the RPMB host controller in accordance with an embodiment of the present disclosure.

Referring to FIGS. 4 and 5, the RPMB device controller 210 may receive a submission command generated from the RPMB host controller 410.

The submission command may have a size of 64 bytes.

The submission command may include an Opcode (Operation code) field, a FUSE (Fused operation) field, a PSDT (PRP or SGL (scatter gather list) for data) field, a CID (Command Identifier) field, an NSID (Namespace Identifier) field, an MPTR (Metadata Pointer) field, PRP entry 1 (PRP ENTRY 1), and PRP entry 2 (PRP ENTRY 2).

The Opcode field may include an opcode of a command to be executed.

The FUSE field may represent whether to be a portion of a fuse operation of forming a composite command by fusing two simpler commands.

The PSDT field may specify whether a PRP or an SGL is to be used for data transmission related to a command. In an embodiment of the present disclosure, the submission command may use the PRP, and hence a value of the PSDT field may be 00b which represents the use of the PRP.

The CID field may specify a unique identifier of a command when the unique identifier is coupled to a submission queue identifier. The NSID field may specify a namespace to which a command is applied.

The MPTR field may include an address for a continuous physical buffer of metadata when the value of the PSDT field is 00b. The address may be aligned as dword.

The PRP entry 1 and the PRP entry 2 may be regions in a DPTR (Data Pointer) field, and the DPTR field may specify data used for a command. The PRP entry 1 may include a first PRP entry or a PRP list pointer with respect to a command. The PRP entry 2 may specify a page base address of a second memory page, or include a PRP list pointer.

In an embodiment, the submission command may include information on a position at which a response of a device to the submission command is to be temporarily stored. For example, the access controller 212 may provide the RPMB host controller 410 with a device RPMB data frame as a response to the submission command. When the device RPMB data frame is provided from the access controller 212 to the RPMB host controller 410, the device RPMB data frame may be temporarily stored in one of a plurality of PRPs 421 in the host memory 420. The information on a position at which the response to the submission command, i.e., the device RPMB data frame is stored may be included in the submission command.

Information on a position at which the response to the submission command is to be stored among the plurality of PRPs may be stored in the PRP entry 1 or the PRP entry 2 in the submission command.

For example, when information on a position in the host memory 420, at which the host RPMB data frame is temporarily stored before the host RPMB data frame is provided to the RPMB device controller 210, is stored in the PRP entry 1 in the submission command, information on a position in the host memory 420, at which the device RPMB data frame as a response to the submission command is temporarily stored before the device RPMB data frame is provided to the RPMB host controller 410, may be stored in the PRP entry 2 in the submission command.

On the contrary, the information on the position in the host memory 420, at which the host RPMB data frame is to be temporarily stored, is stored in the PRP entry 2 in the submission command, the information on the position in the host memory 420, at which the device RPMB data frame as the response to the submission command is to be temporarily stored, may be stored in the PRP entry 1 in the submission command.

Among the plurality of PRPs 421 in the host memory 420, a region in which the host RPMB data frame is stored and a region in which the device RPMB data frame is stored may be different from each other.

FIG. 6 is a diagram illustrating a structure of a RPMB data frame used when a RPMB write operation or a RPMB read operation is performed in accordance with an embodiment of the present disclosure.

Referring to FIGS. 4 and 6, the PRMB data frame may be a data frame provided when an operation on the replayed protected memory block is performed.

The RPMB data frame RPMB Data Frame may include authentication data and metadata.

The RPMB data frame RPMB Data Frame may include Stuff Bytes, Message Authentication Code (MAC), RPMB Target, Nonce, Write Counter, Address, Sector Count, Result, and Request Message Type/Response Message Type.

The Stuff Byte may serve as padding of a data frame.

The MAC may be a result of a calculation using an authentication key and metadata, which are stored previously, the calculation being performed by the RPMB host controller 410. That is, the MAC may be an authentication code calculated by using a hash-based message authentication code (HMAC SHA-256). The MAC may have a length of 256 bits (32 bytes). The authentication key used to generate the MAC may be 256 bits.

The RPMB Target represents a RPMB which becomes a target of Request/Response. When this value is not equal to a value of an NVMe Security Specific Field (NSSF) in a command, the memory controller may return an error value and control an operation on the RPMB not to be performed.

The Nonce may be a random number generated by the RPMB host controller 410. The Nonce provided from the RPMB host controller 410 may be copied to a response which the RPMB device controller 210 is to provide to the RPMB host controller 410.

A value of the Write Counter may be a number of times a write operation on the RPMB 110a is successfully performed.

The Address may be a logical address at which data is to be stored in the RPMB 110a or a logical address at which data is read from the RPMB 110a.

The Sector Count may be a number of logical sectors for which a RPMB write operation or a RPMB read operation is requested. The Sector Count may be a number of logical sectors of a 512-byte unit.

The Result may be a result of the RPMB write operation or the RPMB read operation.

The Request Message Type/Response Message Type may represent which operation selected from the RPMB write operation and the RPMB read operation a RPMB data frame is a message about.

Figure 7:
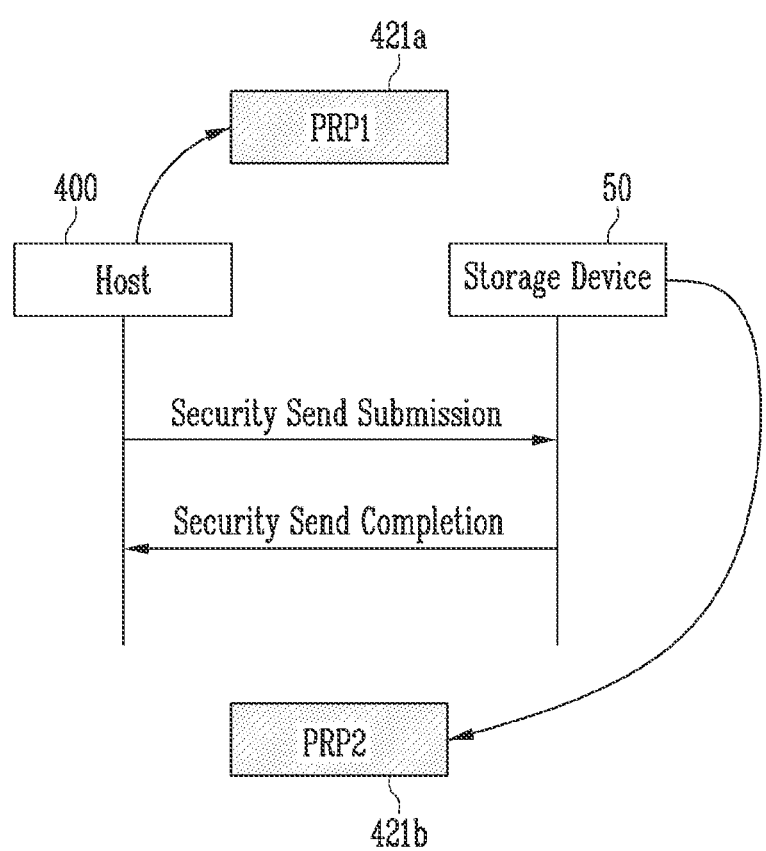
FIG. 7 is a flowchart illustrating a RPMB write operation in accordance with an embodiment of the present disclosure.

FIG. 7 is a flowchart illustrating a RPMB write operation in accordance with an embodiment of the present disclosure. FIGS. 8 and 9 are diagrams illustrating an embodiment of a RPMB data frame provided in the RPMB write operation in accordance with an embodiment of the present disclosure.

Referring to FIGS. 4, 6, and 7, the host 400 may provide a submission command for the RPMB write operation to the storage device 50. The submission command may include information representing that a host RPMB data frame has been stored in the PRP1 421*a* among the plurality of PRPs included in the host memory 420 before the host RPMB data frame is provided to the memory controller 200 in the storage device 50.

A RPMB data frame (host RPMB data frame) for the RPMB write operation may be stored in the PRP1, and have, for example, the same form as shown in FIG. 8. Specifically, the host RPMB data frame of the RPMB write operation may include a message authentication code (MAC) calculated by the host 400, an RPMB target to be accessed, a current write counter value, an address at which data in the RPMB is to be stored, a sector count, a message that the RPMB data frame is an authenticated data write request, and data to be stored.

In addition, the storage device 50 may provide the host 400 with a device RPMB data frame as a response to the submission command for the RPMB write operation. The device RPMB data frame may be stored in the PRP2 421*b* among the plurality of PRPs included in the host memory 420. Information representing that the device RPMB is stored in the PRP2 may also be included in the submission command.

The device RPMB data frame may have, for example, the same form as shown in FIG. 9. Specifically, the device RPMB data frame of the RPMB write operation may include a message authentication code (MAC) calculated by the memory controller 200, an RPMB target sending a response, an increased write counter value, an address at which data in the RPMB is stored, a result code, and a message that the device RPMB data frame is an authenticated data write response.

The submission command may include PRP entry 1 and PRP entry 2. Information representing that the host RPMB data frame is temporarily stored in the PRP1 421*a* before the host RPMB data frame is provided to the memory controller 200 may be included in one of the PRP entry 1 and the PRP entry 2, and information representing that the device RPMB data frame as a response to the submission command is temporarily stored in the PRP2 421*b* before the device RPMB data frame is provided to the host 400 may be included in the other of the PRP entry 1 and the PRP entry 2.

The memory controller 200 may store the device RPMB data frame at an address in the plurality of PRPs and then provide a completion command to the host 400. The completion command may be a command notifying the host 400 that an operation according to the submission command has been completed.

Figure 10:
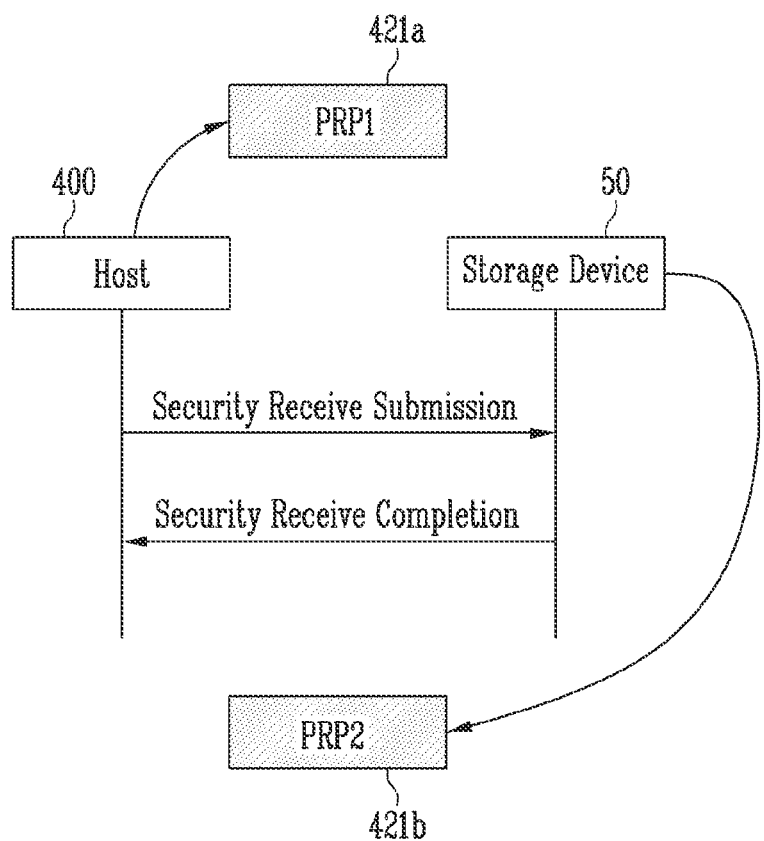
FIG. 10 is a flowchart illustrating a RPMB read operation in accordance with an embodiment of the present disclosure.

FIG. 10 is a flowchart illustrating a RPMB read operation in accordance with an embodiment of the present disclosure. FIGS. 11 and 12 are diagrams illustrating an embodiment of a RPMB data frame provided in the RPMB read operation in accordance with an embodiment of the present disclosure.

Referring to FIGS. 4, 6, and 10, the host 400 may provide a submission command for the RPMB read operation to the storage device 50. The submission command may include information representing that a host RPMB data frame has been stored in the PRP1 421*a* among the plurality of PRPs included in the host memory 420 before the host RPMB data frame is provided to the memory controller 200 in the storage device 50.

A RPMB data frame (host RPMB data frame) for the RPMB read operation may be stored in the PRP1, and have, for example, the same form as shown in FIG. 11. Specifically, the host RPMB data frame of the RPMB read operation may include an RPMB target to be accessed, nonce provided by the host, an address at which data in the RPMB is to be stored, a sector count, and a message that the RPMB data frame is an authenticated data read request.

In addition, the storage device 50 may provide the host 400 with a device RPMB data frame as a response to the submission command for the RPMB read operation. The device RPMB data frame may be stored in the PRP2 421*b* among the plurality of PRPs included in the host memory 420. Information representing that the device RPMB is stored in the PRP2 421*b* may also be included in the submission command.

The device RPMB data frame may have, for example, the same form as shown in FIG. 12. Specifically, the device RPMB data frame of the RPMB read operation may include a message authentication code (MAC) calculated by the memory controller 200, an RPMB target sending a response, a copy of nonce provided by the host, an address at which data in the RPMB is stored, a result code, a message that the device RPMB data frame is an authenticated data read response, and data read from the RPMB target.

The submission command may include PRP entry 1 and PRP entry 2. Information representing that the host RPMB data frame is temporarily stored in the PRP1 421*a* before the host RPMB data frame is provided to the memory controller 200 may be included in one of the PRP entry 1 and the PRP entry 2, and information representing that the device RPMB data frame as a response to the submission command is temporarily stored in the PRP2 421*b* before the device RPMB data frame is provided to the host 400 may be included in the other of the PRP entry 1 and the PRP entry 2.

Figure 13:
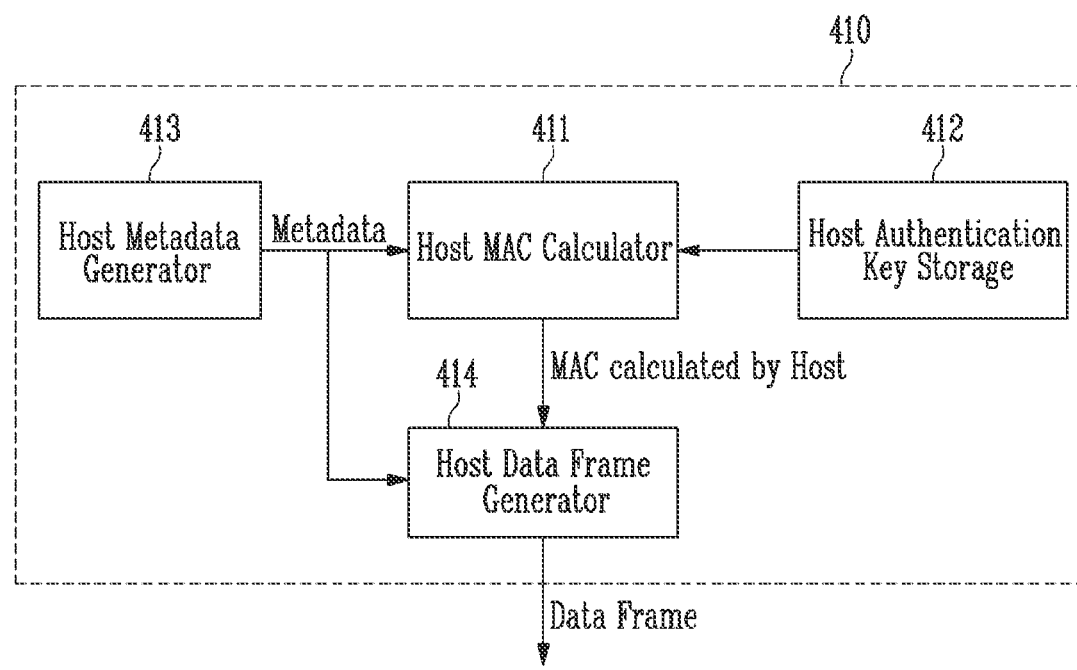
FIG. 13 is a diagram illustrating an operation of a RPMB host controller shown in FIG. 4 in accordance with an embodiment of the present disclosure.

FIG. 13 is a diagram illustrating an operation of the RPMB host controller 140 shown in FIG. 4 in accordance with an embodiment of the present disclosure.

Referring to FIG. 13, the RPMB host controller 410 may include a host message authentication code calculator (host MAC calculator) 411, a host authentication key storage 412, a host metadata generator 413, and a host data frame generator 414.

The host authentication key storage 412 may store an authentication key Key. The authentication key Key stored by the host authentication key storage 412 may be an authentication key Key equal to an authentication key Key stored by the storage device 50. The authentication key Key may be pre-stored before a write or read operation on the RPMB is performed.

As a submission command requesting the RPMB to store write data is received, the host metadata generator 413 may generate metadata when a RPMB write operation is performed. The metadata may include an RPMB target to be accessed, a current write counter value, an address at which data is to be stored, a sector count of the data to be stored, information representing that a RPMB data frame is a message requesting the RPMB write operation.

The host metadata generator 413 may provide the generated metadata to the host message authentication code calculator 411 and the host data frame generator 414.

The host message authentication code calculator 411 may generate a message authentication code (MAC) by using the metadata and the authentication key. Specifically, the host message authentication code calculator 411 may generate the MAC by using a hash-based message authentication code (HMAC SHA-256). The generated MAC may be used for the storage device 50 to perform an authentication operation. The MAC may have a length of 256 bits (32 bytes). The authentication key Key used to generate the MAC may have 256 bits. The host message authentication code calculator 411 may provide the generated MAC to the host data frame generator 414.

The host data frame generator 414 may generate a host RPMB data frame to be provided to the storage device 50. Specifically, the host data frame generator 414 may generate the host RPMB data frame including authentication data and metadata. The authentication data may include the MAC generated by the host message authentication code calculator 411. The host data frame generator 411 may generate the host RPMB data frame, and provide the generated host RPMB data frame to the storage device 50. The host RPMB data frame may be stored in one of the plurality of PRPs 421 included in the host memory before the host RPMB data frame is provided to the memory controller 200 in the storage device 50. The submission command may include information on a position in the host memory, at which the host RPMB data frame is temporarily stored and information on a position in the host memory, at which a device RPMB data frame as a response to the submission command is temporarily stored.

Subsequently, the RPMB host controller 410 may acquire, from the storage device 50, a device RPMB data frame as the response to the submission command. The device RPMB data frame provided by the storage device 50 may include an MAC generated by the memory controller 200, an RPMB target sending a response, an increased write counter value, an address at which data is stored, a result code obtained by performing a RPMB write operation, and a message that the device RPMB data frame is a write response of the RPMB. The device RPMB data frame may be temporarily stored in one of the plurality of PRPs 421 included in the host memory according to information stored in the submission command, before the device RPMB data frame is provided to the RPMB host controller 410.

When a RPMB read operation is performed, the host metadata generator 413 may generate metadata. The metadata may include an RPMB target to be accessed, nonce as an arbitrary random number, an address to be read, a sector count to be read, and information representing that a RPMB data frame is a message requesting the RPMB read operation.

The host metadata generator 413 may provide the generated metadata to the host data frame generator 414.

The host data frame generator 414 may generate a host RPMB data frame to be provided to the storage device 50. Specifically, the host data frame generator 414 may generate the host RPMB data frame including the generated metadata. The host data frame generator 414 may generate the host RPMB data frame, and provide the generated host RPMB data frame to the storage device 50. The host RPMB data frame may be temporarily stored in one of the plurality of PRPs 421 included in the host memory, before the host RPMB data frame is provided to the memory controller 200. The submission command may include information on a position in the host memory, at which the host RPMB data frame is temporarily stored, and information on a position in the host memory, at which a device RPMB data frame as a response to the submission command is temporarily stored.

Subsequently, the RPMB host controller 410 may acquire, from the storage device 50, the device RPMB data frame as the response to the submission command. The device RPMB data frame provided by the storage device 50 may include an MAC generated by the memory controller 200, an RPMB target sending a response, a copy of nonce generated by the host metadata generator 413, a read address, a read sector count, a result code obtained by performing the replay protection memory block read operation, a message representing a read response of the RPMB, and read data. The device RPMB data frame may be temporarily stored in one of the plurality of PRPs 421 included in the host memory according to information stored in the submission command, before, the device RPMB data frame is provided to the RPMB host controller 410.

The RPMB host controller 410 may perform an authentication operation on the read data by using the metadata included in the received RPMB data frame and the authentication key stored in the host authentication key storage 412. The RPMB host controller 410 may acquire the read data or destroy the read data according to a result of the authentication operation.

Figure 14:
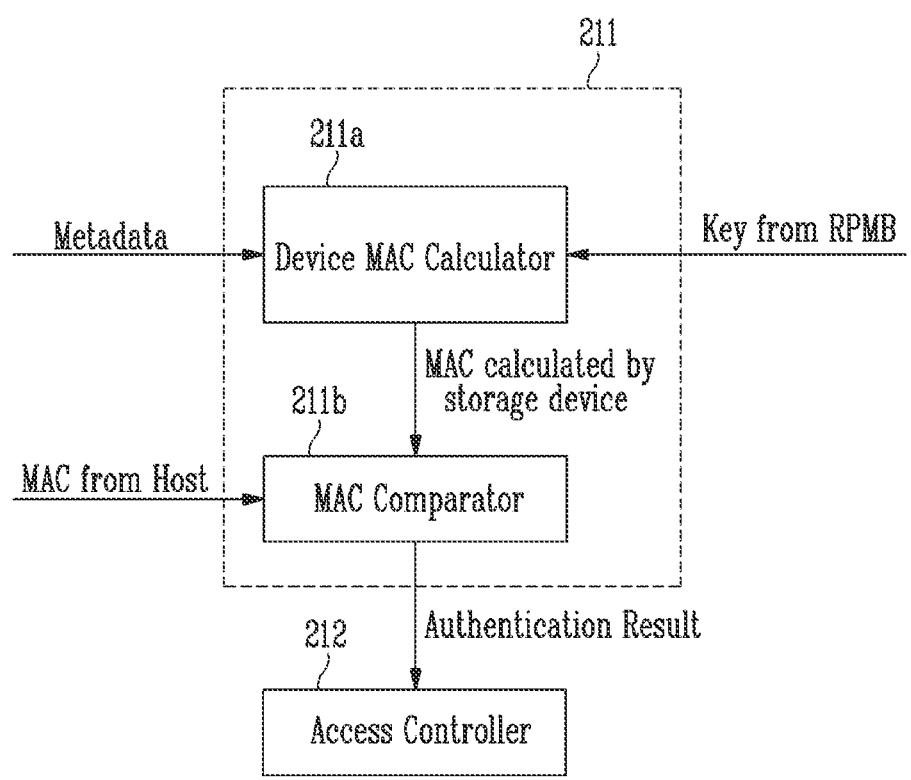
FIG. 14 is a diagram illustrating an operation of a RPMB device controller shown in FIG. 4 in the RPMB write operation in accordance with an embodiment of the present disclosure.

FIG. 14 is a diagram illustrating an operation of the RPMB device controller shown in FIG. 4 in the RPMB write operation in accordance with an embodiment of the present disclosure.

Referring to FIG. 14, the RPMB device controller 210 may include the authentication manager 211 and the access controller 212.

The authentication manager 211 may include a device message authentication code calculator (device MAC calculator) 211*a* and a message authentication code comparator (MAC comparator) 211*b*.

In the RPMB write operation, the device message authentication code calculator 211*a* may acquire metadata from a host RPMB data frame received from the RPMB host controller 410. The device message authentication code calculator 211*a* may acquire an authentication key stored in the RPMB. The device message authentication code calculator 211*a* may calculate a Message Authentication Code (MAC) by using a hash-based authentication code (HMAC SHA-256). The device message authentication code calculator 211*a* may calculate MAC and provide the calculated MAC to the message authentication code comparator 211*b* by using the metadata of the host RPMB data frame received from the RPMB host device 410 and the authentication key stored in the RPMB of the memory device.

The message authentication code comparator 211*b* may acquire an MAC from the host RPMB data frame received from the RPMB host controller 410. Specifically, the message authentication code comparator 211*b* may acquire an MAC generated by the RPMB host controller 410 from the host RPMB data frame received from the RPMB host controller 410. The message authentication code comparator 211*b* may compare whether the MAC generated by the RPMB host controller 410 and the MAC calculated by the device message authentication code calculator 210*a* accord with each other. The message authentication code comparator 211*b* may provide a comparison result to the access controller 212.

When the MAC generated by the RPMB host controller 410 and the MAC calculated by the device message authentication code calculator 210*a* accord with each other, the access controller 212 may control the memory device to store data in the RPMB. The access controller 212 may increase a write counter value.

When the MAC generated by the RPMB host controller 410 and the MAC calculated by the device message authentication code calculator 210*a* do not accord with each other, the access controller 212 may not store any data in the RPMB. The access controller 212 may not increase the write counter value.

Subsequently, the access controller 212 may generate a device RPMB data frame. Specifically, the access controller 212 may provide the host 400 with the device RPMB data frame as a response to a submission command from the host 400.

The device RPMB data frame which the access controller 212 provides to the host 400 may include the MAC calculated by the device message authentication code calculator 211a. The device RPMB data frame which the access controller 212 provides to the host 400 may further include an RPMB target sending a response, a write counter value, an address at which data is stored, a result code obtained by performing the RPMB write operation, and a message that the device RPMB data frame is a write response of the RPMB. The write counter value may include an increased write counter value when the RPMB write operation succeeds. In addition, the result code may be a result code representing that the RPMB write operation has succeeded. On the contrary, when the RPMB write operation fails, the write counter value may include an existing write counter value. In addition, the result code may be a result code representing a reason why the RPMB write operation fails.

Figure 15:
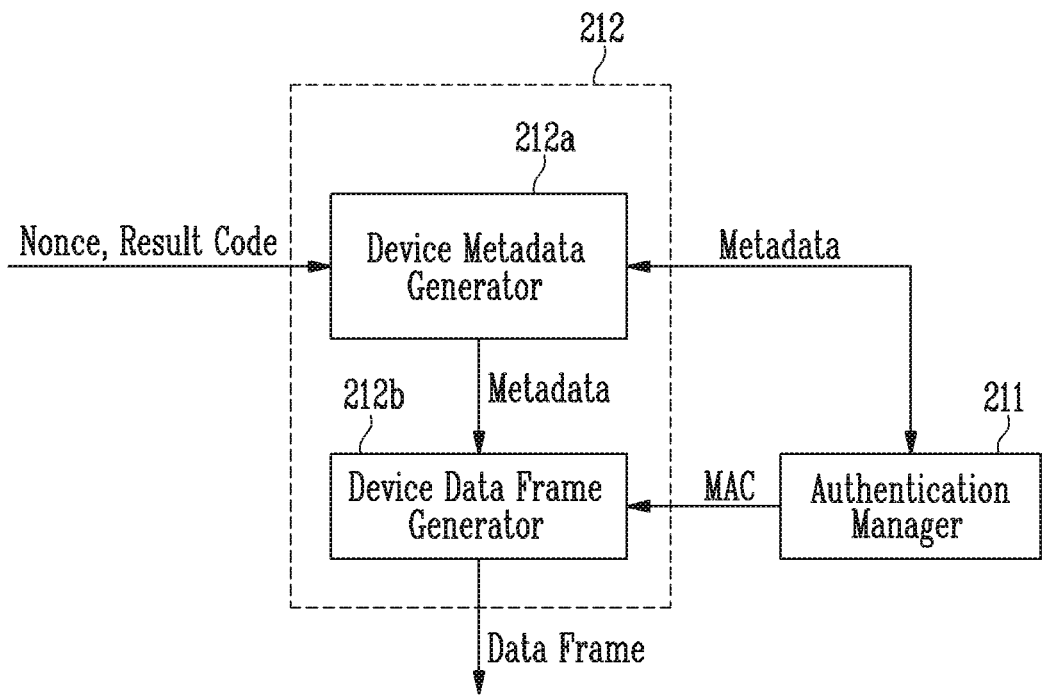
FIG. 15 is a diagram illustrating an operation of the RPMB device controller shown in FIG. 4 in the RPMB read operation in accordance with an embodiment of the present disclosure.

FIG. 15 is a diagram illustrating an operation of the RPMB device controller 210 shown in FIG. 4 in the RPMB read operation in accordance with an embodiment of the present disclosure.

Referring to FIG. 15, the RPMB device controller 210 may include the authentication manager 211 and the access controller 212. The access controller 212 may include a device metadata generator 212a and a device data frame generator 212b.

In the RPMB read operation, the device metadata generator 212a may acquire metadata from a host RPMB data frame provided by the RPMB host controller 410, and acquire nonce included in the metadata. Subsequently, the RPMB device controller 210 may read data stored in the RPMB, and acquire the data stored in the RPMB.

The device metadata generator 212a may generate metadata including a nonce value included in the host RPMB data frame provided by the RPMB host controller 410 and a result code representing a result of the RPMB read operation. The device metadata generator 212a may provide the generated metadata to the authentication manager 211. The authentication manager 211 may calculate a Message Authentication Code (MAC) by using a hash-based message authentication code (HMAC SHA-256). Specifically, the authentication manager 211 may calculate the MAC by using the authentication key stored in the RPMB and the metadata generated by the device metadata generator 212a. The authentication manager 211 may provide the calculated MAC to the device data frame generator 212b.

The device data frame generator 212b may generate a device RPMB data frame. Specifically, the device data frame generator 212b may provide the host 400 with the device RPMB data frame as a response to a submission command from the host 400. The device RPMB data frame may include the MAC calculated by the authentication manager 211. The device RPMB data frame may further include an RPMB target sending a response, a copy of nonce of the host RPMB data frame, a read address, a read sector count, a result code, a message that the device RPMB data frame is a write response of the RPMB, and read data.

Figure 16:
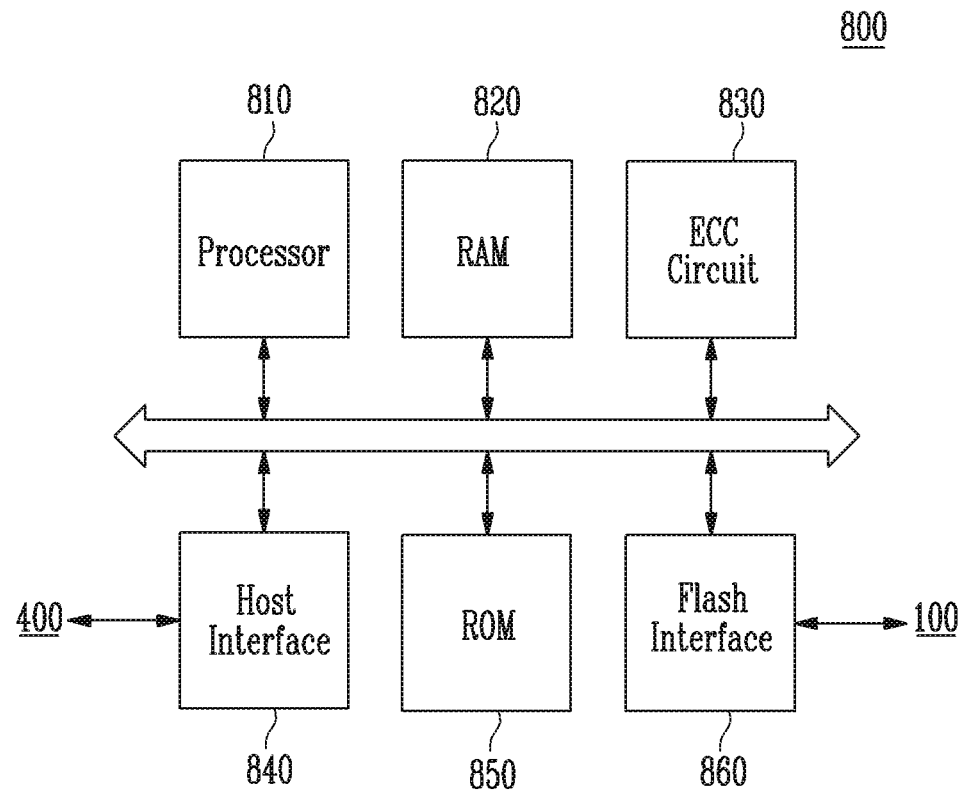
FIG. 16 is a diagram illustrating a memory controller shown in FIG. 1 in accordance with another embodiment of the present disclosure.

FIG. 16 is a diagram illustrating the memory controller shown in FIG. 1 in accordance with another embodiment of the present disclosure.

Referring to FIG. 16, the memory controller 800 may include a processor 810, a RAM 820, an error correction code (ECC) circuit 830, a host interface 840, a ROM 850, and a flash interface 860.

The processor 810 may control overall operations of the memory controller 800. The RAM 820 may be used as a buffer memory, a cache memory, a working memory, or the like of the memory controller 800.

The ROM 850 may store, in a firmware form, various information required when the memory controller 800 operates.

The memory controller 800 may communicate with an external device (e.g., the host 400, an application processor, or the like) through the host interface 840.

The memory controller 800 may communicate with the memory device 100 through the flash interface 860. The memory controller 800 may transmit a command CMD, an address ADDR, a control signal CTRL, and the like to the memory device 100 through the flash interface 860, and receive data DATA. The flash interface 860 may include a NAND interface.

Figure 17:
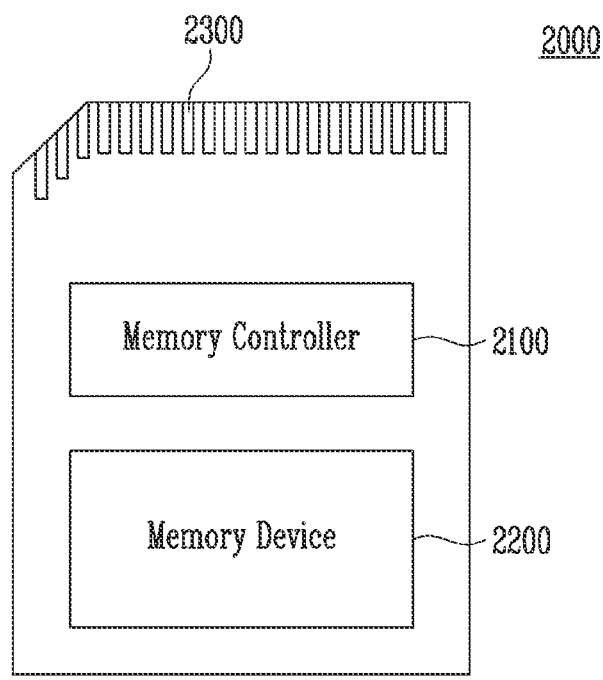
FIG. 17 is a block diagram illustrating a memory card system to which the storage device is applied in accordance with an embodiment of the present disclosure.

FIG. 17 is a block diagram illustrating a memory card system to which the storage device is applied in accordance with an embodiment of the present disclosure.

Referring to FIG. 17, the memory card system 2000 includes a memory controller 2100, a memory device 2200, and a connector 2300.

The memory controller 2100 is connected to the memory device 2200. The memory controller 2100 may access the memory device 2200. For example, the memory controller 2100 may control read, program, erase, and background operations of the memory device 2200. The memory controller 2100 provides an interface between the memory device 2200 and a host Host. The memory controller 2100 drives firmware for controlling the memory device 2200. The memory controller 2100 may be implemented identically to the memory controller 200 described with reference to FIG. 1. The memory device 2200 may be implemented identically to the memory device 100 described with reference to FIG. 1.

The memory controller 2100 may include components such as a Random Access Memory (RAM), a processing unit, a host interface, a memory interface, and an ECC circuit.

The memory controller 2100 may communicate with an external device through the connector 2300. The memory controller 2100 may communicate with the external device (e.g., the host) according to a specific communication protocol. The memory controller 2100 may communicate with the external device through at least one of various communication standards or interfaces such as a Universal Serial Bus (USB), a Multi-Media Card (MMC), an embedded MMC (eMMC), a Peripheral Component Interconnection (PCI), a PCI express (PCIe), an Advanced Technology Attachment (ATA), a Serial-ATA (SATA), a Parallel-ATA (PATA), a Small Computer System Interface (SCSI), an Enhanced Small Disk Interface (ESDI), an Integrated Drive Electronics (IDE), firewire, a Universal Flash Storage (UFS), Wi-Fi, Bluetooth, and NVMe. The connector 2300 may be defined by at least one of the above-described various communication protocols.

The memory device 2200 may be implemented with various nonvolatile memory devices such as an Electrically Erasable and Programmable ROM (EEPROM), a NAND flash memory, a NOR flash memory, a Phase-change RAM (PRAM), a Resistive RAM (ReRAM), a Ferroelectric RAM (FRAM), and a Spin Torque Transfer magnetic RAM (STT-MRAM).

The memory controller 2100 and the memory device 2200 may be integrated into a single semiconductor device, to constitute a memory card. For example, the memory controller 2100 and the memory device 2200 may constitute a memory card such as a PC card (Personal Computer Memory Card International Association (PCMCIA)), a Compact Flash (CF) card, a Smart Media Card (SM and SMC), a memory stick, a Multi-Media Card (MMC, RS-MMC, MMCmicro and eMMC), an SD card (SD, miniSD, microSD and SDHC), and a Universal Flash Storage (UFS).

Figure 18:
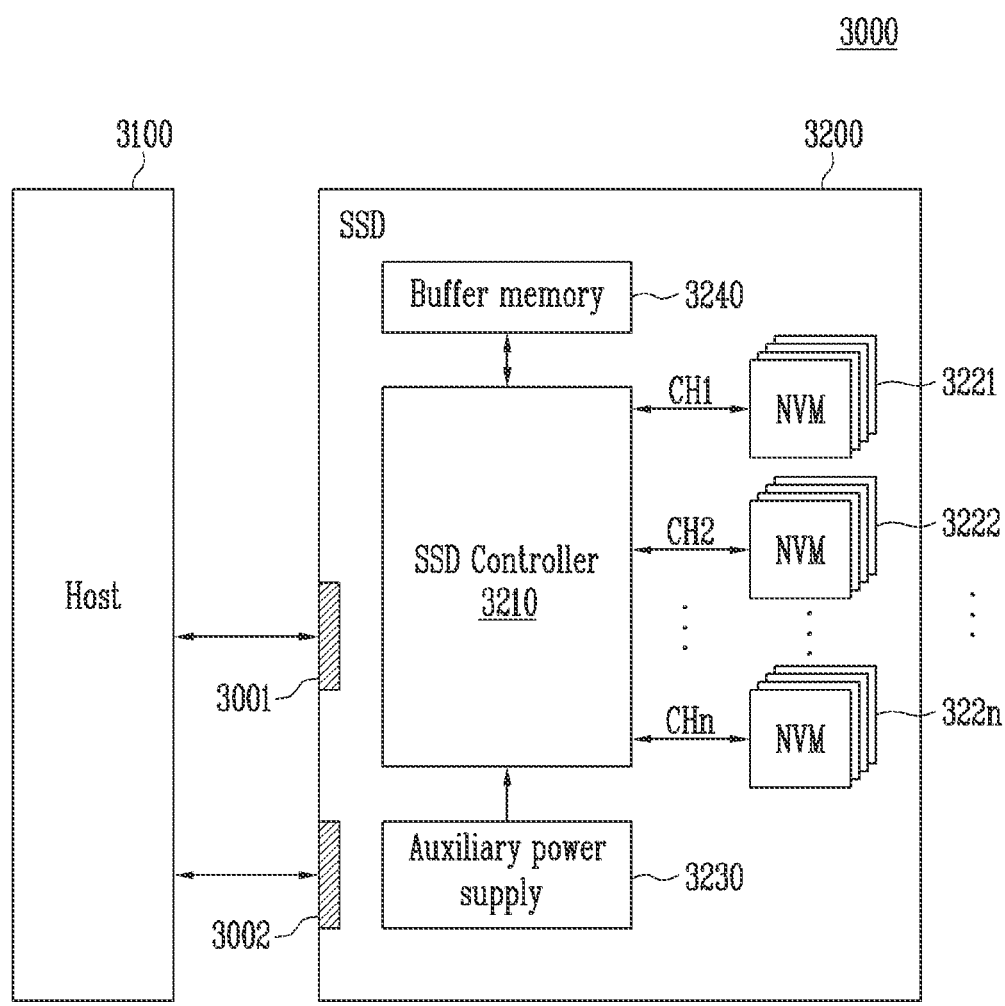
FIG. 18 is a block diagram illustrating a Solid State Drive (SSD) system to which the storage device is applied in accordance with an embodiment of the present disclosure.

FIG. 18 is a block diagram illustrating a Solid State Drive (SSD) system to which the storage device is applied in accordance with an embodiment of the present disclosure.

Referring to FIG. 18, the SSD system 3000 includes a host 3100 and an SSD 3200. The SSD 3200 exchanges a signal with the host 3100 through a signal connector 3001, and receives power through a power connector 3002. The SSD 3200 includes an SSD controller 3210, a plurality of nonvolatile memories (NVM) such as a plurality of flash memories 3221 to 322n, an auxiliary power supply 3230, and a buffer memory 3240.

In an embodiment, the SSD controller 3210 may serve as the memory controller 200 described with reference to FIG. 1.

The SSD controller 3210 may control the plurality of flash memories 3221 to 322n in response to a signal received from the host 3100. The signal may be a signal based on an interface between the host 3100 and the SSD 3200. For example, the signal may be a signal defined by at least one of communication standards or interfaces such as a Universal Serial Bus (USB), a Multi-Media Card (MMC), an embedded MMC (eMMC), a Peripheral Component Interconnection (PCI), a PCI express (PCIe), an Advanced Technology Attachment (ATA), a Serial-ATA (SATA), a Parallel-ATA (PATA), a Small Computer System Interface (SCSI), an Enhanced Small Disk Interface (ESDI), an Integrated Drive Electronics (IDE), a firewire, a Universal Flash Storage (UFS), a Wi-Fi, a Bluetooth, and an NVMe.

The auxiliary power supply 3230 is connected to the host 3100 through the power connector 3002. The auxiliary power supply 3230 may receive the power PWR input from the host 3100, and charge with the power PWR. When the supply of power from the host 3100 is not smooth, the auxiliary power supply 3230 may provide power to the SSD 3200. The auxiliary power supply 3230 may be located in the SSD 3200, or be located at the outside of the SSD 3200. For example, the auxiliary power supply 3230 may be located on a main board, and provide auxiliary power to the SSD 3200.

The buffer memory 3240 operates as a buffer memory of the SSD 3200. For example, the buffer memory 3240 may temporarily store data received from the host 3100 or data received from the plurality of flash memories 3221 to 322n, or temporarily store metadata (e.g., a mapping table) of the flash memories 3221 to 322n. The buffer memory 3240 may include volatile memories such as a DRAM, an SDRAM, a DDR SDRAM, an LPDDR SDRAM, and a GRAM or nonvolatile memories such as a FRAM, a ReRAM, an STT-MRAM, and a PRAM.

Figure 19:
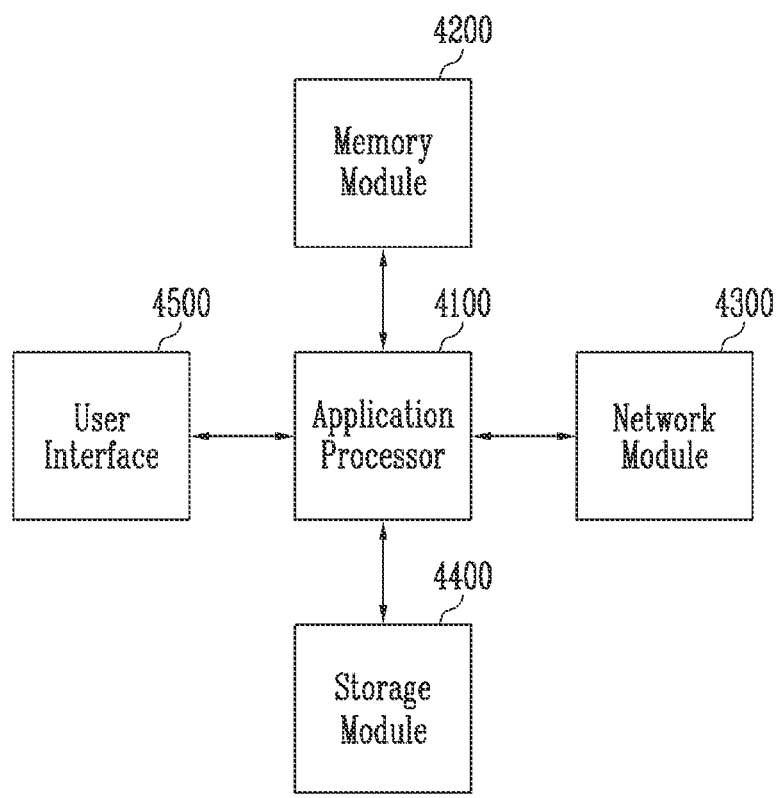
FIG. 19 is a block diagram illustrating a user system to which the storage device is applied in accordance with an embodiment of the present disclosure.

FIG. 19 is a block diagram illustrating a user system to which the storage device is applied in accordance with an embodiment of the present disclosure.

Referring to FIG. 19, the user system 4000 includes an application processor 4100, a memory module 4200, a network module 4300, a storage module 4400, and a user interface 4500.

The application processor 4100 may drive components included in the user system 4000, an operating system (OS), a user program, or the like. The application processor 4100 may include controllers for controlling components included in the user system 4000, interfaces, a graphic engine, and the like. The application processor 4100 may be provided as a System-on-Chip (SoC).

The memory module 4200 may operate as a main memory, working memory, buffer memory or cache memory of the user system 4000. The memory module 4200 may include volatile random access memories such as a DRAM, an SDRAM, a DDR SDRAM, a DDR2 SDRM, a DDR3 SDRAM, an LPDDR SDRAM, an LPDDR2 SDRAM, and an LPDDR3 SDRAM or nonvolatile random access memories such as a PRAM, a ReRAM, an MRAM, and a FRAM. The application processor 4100 and the memory module 4200 may be provided as one semiconductor package by being packaged based on a Package on Package (POP).

The network module 4300 may communicate with external devices. The network module 4300 may support wireless communications such as Code Division Multiple Access (CDMA), Global System for Mobile communication (GSM), Wideband CDMA (WCDMA), CDMA-2000, Time Division Multiple Access (TDMA), Long Term Evolution (LTE), WiMAX, WLAN, UWB, Bluetooth, and Wi-Fi. The network module 4300 may be included in the application processor 4100.

The storage module 4400 may store data. For example, the storage module 4400 may store data received from the application processor 4100. Alternatively, the storage module 4400 may transmit data stored therein to the application processor 4100. The storage module 4400 may be implemented with a nonvolatile semiconductor memory device such as a Phase-change RAM (PRAM), a Magnetic RAM (MRAM), a Resistive RAM (RRAM), a NAND flash, a NOR flash, or a NAND flash having a three-dimensional structure. The storage module 4400 may be provided as a removable drive such as a memory card of the user system 4000 or an external drive.

The storage module 4400 may include a plurality of nonvolatile memory devices, and the plurality of nonvolatile memory devices may operate identically to the memory device 100 described with reference to FIG. 1. The storage module 4400 may operate identically to the storage device 50 described with reference to FIG. 1.

The user interface 4500 may include interfaces for inputting data or commands to the application processor 4100 or outputting data to an external device. The user interface 4500 may include user input interfaces such as a keyboard, a keypad, a button, a touch panel, a touch screen, a touch pad, a touch ball, a camera, a microphone, a gyroscope sensor, a vibration sensor and a piezoelectric element. The user interface 4500 may include user output interfaces such as a Liquid Crystal Display (LCD), an Organic Light Emitting Diode (OLED) display device, an Active Matrix OLED (AMOLED) display device, an LED, a speaker, and a monitor.

In accordance with the present disclosure, there is provided a storage device for providing an improved security function and an operating method of the storage device.

While the present disclosure has been shown and described with reference to certain embodiments thereof, it will be understood by those skilled in the art that various changes in form and details may be made therein without departing from the spirit and scope of the present disclosure as defined by the appended claims and their equivalents. Therefore, the scope of the present disclosure should not be limited to the above-described embodiments but should be determined by not only the appended claims but also the equivalents thereof.

In the above-described embodiments, all operations may be selectively performed or part of the operations may be omitted. In each embodiment, the operations are not necessarily performed in accordance with the described order and may be rearranged. The embodiments disclosed in this specification and drawings are only examples to facilitate an understanding of the present disclosure, and the present disclosure is not limited thereto. That is, it should be apparent to those skilled in the art that various modifications can be made on the basis of the technological scope of the present disclosure.

Moreover, the embodiments of the present disclosure have been described in the drawings and specification. Although specific terminologies are used here, the terms are only to describe the embodiments of the present disclosure. Therefore, the present disclosure is not restricted to the above-described embodiments and many variations are possible within the spirit and scope of the present disclosure. It should be apparent to those skilled in the art that various modifications can be made on the basis of the technological scope of the present disclosure in addition to the embodiments disclosed herein.

Although various embodiments have been described for illustrative purposes, it will be apparent to those skilled in the art that various changes and modifications may be made without departing from the spirit and scope of the invention as defined in the following claims. Furthermore, the embodiments may be combined to form additional embodiments.

What is claimed is:

1. A storage device comprising:
   a nonvolatile memory device including a replay protected memory block (RPMB); and
   a memory controller configured to acquire, in response to a submission command provided from an external host, a host RPMB data frame stored in one of a plurality of Physical Region Pages (PRPs) included in the host, and access the RPMB,
   wherein the submission command includes information on a position within the plurality of PRPs at which the memory controller is to store a response to the submission command.

2. The storage device of claim 1, wherein the submission command includes information on an address in the plurality of PRPs, at which the host RPMB data frame is stored.

3. The storage device of claim 2, wherein, among the plurality of PRPs, a position indicated by the address is different from the position at which the memory controller is to store the response to the submission command.

4. The storage device of claim 3, wherein the submission command includes an Operation code field, a Fused operation field, a Physical Region Page (PRP) or scatter gather list for data field, a Command Identifier field, a Namespace Identifier field, a Metadata Pointer field, a PRP entry 1, and a PRP entry 2.

5. The storage device of claim 4,
   wherein the information on the address at which the host RPMB data frame is stored is included in one of the PRP entry 1 and the PRP entry 2, and
   wherein the information on the position at which the memory controller is to store the response to the submission command is included in the other of the PRP entry 1 and the PRP entry 2.

6. The storage device of claim 1, wherein the response to the submission command includes a device RPMB data frame including information representing that the device RPMB data frame is a response to the host RPMB data frame.

* * * * *